United States Patent
Zhou (10) Patent No.: US 11,589,259 B2
(45) Date of Patent: *Feb. 21, 2023

(54) HARQ FEEDBACK METHOD AND APPARATUS, USER EQUIPMENT, AND BASE STATION THEREOF

(71) Applicant: Beijing Xiaomi Mobile Software Co., Ltd., Beijing (CN)

(72) Inventor: Juejia Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 178 days.

This patent is subject to a terminal disclaimer.

(21) Appl. No.: 16/623,123

(22) PCT Filed: Jun. 16, 2017

(86) PCT No.: PCT/CN2017/088705
§ 371 (c)(1),
(2) Date: Dec. 16, 2019

(87) PCT Pub. No.: WO2018/227574
PCT Pub. Date: Dec. 20, 2018

(65) Prior Publication Data
US 2020/0221337 A1  Jul. 9, 2020

(51) Int. Cl.
*H04W 28/04* (2009.01)
*H04L 1/1812* (2023.01)
(52) U.S. Cl.
CPC ........... *H04W 28/04* (2013.01); *H04L 1/1812* (2013.01)
(58) Field of Classification Search
None
See application file for complete search history.

(56) References Cited

U.S. PATENT DOCUMENTS

| 2012/0236705 A1 | 9/2012 | Hayashi et al. |
| 2014/0056278 A1 | 2/2014 | Marinier et al. |
| 2016/0227573 A1* | 8/2016 | Quan ............. H04L 5/0091 |
| 2017/0135101 A1* | 5/2017 | Li ................. H04W 72/0406 |

(Continued)

FOREIGN PATENT DOCUMENTS

| CN | 101034961 A | 9/2007 |
| CN | 101401342 A | 4/2009 |

(Continued)

OTHER PUBLICATIONS

3GPP TSG RAN WG1 Meeting #88bis, Spokane, USA Apr. 3-7, 2017, R1-1705407, Samsung. (Year: 2017).*

(Continued)

*Primary Examiner* — Andrew C Oh
(74) *Attorney, Agent, or Firm* — Finnegan, Henderson, Farabow, Garrett & Dunner, L.L.P.

(57) ABSTRACT

A HARQ feedback method includes: receiving a first-service data transmission from a base station, schedule control data of the first- service data transmission carrying indication information, the indication information explicitly or implicitly indicating that second-service data preempts a transmission resource of first-service data or second-service data preempts a transmission resource position of first-service data; retaining the second-service data preempting the transmission resource in a cache according to the indication information, and generating HARQ feedback information of the first-service data; and sending the HARQ feedback information to the base station.

16 Claims, 6 Drawing Sheets

(56) References Cited

U.S. PATENT DOCUMENTS

| | | | | |
|---|---|---|---|---|
| 2017/0310431 | A1* | 10/2017 | Iyer | H04L 1/1819 |
| 2017/0367110 | A1* | 12/2017 | Li | H04W 72/1268 |
| 2018/0035446 | A1* | 2/2018 | Li | H04W 72/1236 |
| 2018/0035455 | A1* | 2/2018 | Xu | H04L 5/0048 |
| 2018/0054788 | A1* | 2/2018 | Kwon | H04L 27/2675 |
| 2018/0279291 | A1* | 9/2018 | Tiirola | H04W 72/0413 |
| 2019/0268120 | A1* | 8/2019 | Gao | H04L 5/0048 |
| 2019/0288801 | A1* | 9/2019 | Yang | H04L 5/0055 |
| 2019/0363833 | A1* | 11/2019 | Wang | H04L 1/1819 |
| 2020/0014517 | A1* | 1/2020 | Takeda | H04L 5/0007 |
| 2020/0107386 | A1* | 4/2020 | Van Phan | H04W 28/0215 |
| 2020/0153561 | A1* | 5/2020 | Khosravirad | H04L 1/1835 |
| 2020/0162201 | A1* | 5/2020 | Zhou | H04L 1/1607 |
| 2020/0162212 | A1* | 5/2020 | Liu | H04L 5/0091 |
| 2020/0266922 | A1* | 8/2020 | Zhang | H04L 5/0016 |
| 2020/0374043 | A1* | 11/2020 | Lei | H04W 72/0413 |
| 2021/0120537 | A1* | 4/2021 | Lei | H04L 5/0053 |

FOREIGN PATENT DOCUMENTS

| | | |
|---|---|---|
| CN | 101911811 A | 12/2010 |
| CN | 102479159 A | 5/2012 |
| CN | 106714315 A | 5/2017 |
| JP | 2003324496 A | 11/2003 |
| JP | 2012199719 A | 10/2012 |
| JP | 2015531220 A | 10/2015 |
| RU | 2546611 C2 | 4/2015 |
| WO | WO 2016/118329 A | 7/2016 |

OTHER PUBLICATIONS

Extended European Search Report of counterpart EP Application No. 17913507.4 dated Jun. 2, 2020.

Samsung, Multiplexing of eMBB and URLLC in Downlink, 3GPP TSG RAN WG1 Meeting #88bis, R1-1705407, Spokane, USA, Apr. 3-7, 2017, 7 pages.

NTT Docomo Inc., On dynamic multiplexing of eMBB and URLLC for downlink, 3GPP TSG RAN WG1 Meeting #88, R1-1702817, Athens, Greece, Feb. 13-17, 2017, 4 pages.

NTT Docomo Inc., CBG based (re)transmission, preemption indication and subsequent transmission in NR, 3GPP TSG RAN WG1 Meeting #89, R1-1708384, Hangzhou, P.R. China, May 15-19, 2017, 8 pages.

Acceptance Decision of counterpart Russian Application No. 2019142998/07 dated Sep. 14, 2020.

Notice of Rejection of Japanese Application No. 2019-569212 dated Feb. 3, 2021.

Notice of Preliminary Rejection of Korean Application No. 10-2020-7001222 dated Mar. 12, 2021.

International Search Report of PCT Application No. PCT/CN2017/088705 dated Mar. 21, 2018.

First Office Action of Chinese Application No. 201780000609.0 dated Apr. 12, 2019.

Samsung, Indication of Preempted Resources, R1-1708036, 3GPP TSG RAN WG1 Meeting#89, Hangzhou, P.R. China, May 15-19, 2017, 4 pages.

Fujitsu, Discussion on Preemption Indicator for Multiplexing eMBB and URLLC in Downlink, R1 -1701920, 3GPP TSG RAN WG1 Meeting#88, Athens, Greece, Feb. 13-17, 2017, 5 pages.

Intel Corporation, Indication of Preemption of DL Transmissions, R1-1707414, 3GPP TSG RAN WG1 Meeting#89, Hangzhou, P.R. China, May 17-19, 2017, 6 pages.

Samsung, Indication of Pre-empted Resources Prior to HARQ-ACK Feedback, R1-1708038, 3GPP TSG RAN WG1 Meeting#89, Hangzhou, P.R. China, May 17-19, 2017, 6 pages.

* cited by examiner

HARQ FEEDBACK METHOD AND APPARATUS, USER EQUIPMENT, AND BASE STATION THEREOF

CROSS REFERENCE TO RELATED APPLICATIONS

This application is a national phase application based on PCT/CN2017/088705, filed Jun. 16, 2017, the content of which is incorporated herein by reference.

TECHNICAL FIELD

The present disclosure relates to the field of communication technologies, and in particular, relates to a hybrid automatic repeat request (HARQ) feedback method and apparatus, a method and apparatus for sending indication information, and user equipment (UE), a base station and a computer-readable storage medium thereof.

BACKGROUND

With the developments of communications technologies, the $5^{th}$ Generation mobile communications technology (5G) has been developed. Service types in the 5G at least include enhanced mobile broad band (eMBB), massive machine type communication (mMTC), ultra reliable low latency communication (URLLC) and the like. These service types all pertain to data services, but impose different requirements on latency and reliability. For example, the URLLC service is applied in the fields such as the Internet of vehicles in which a low latency is required. This service imposes a stricter requirement on timeliness, and requires timely service establishment, or even preempts the original services. The mMTC service is not sensitive to latency, and in this service, data may be transmitted at a longer time interval. One way of implementing effective transmission of latency-sensitive services is to improve transmission of a hybrid automatic repeat request (HARQ), such that, for example, retransmission feedback is quicker and more accurate.

In Long Term Evolution (LTE), HARQ feedback is carried out with a transmission block (TB) as a unit, and each TB feeds back a 1-bit acknowledgement (ACK) or non-acknowledgement (NACK) message. To improve retransmission accuracy, 3rd Generation Partnership Project (3GPP) has proposed retransmission based on a code block group (CBG). The CBG is an even smaller data unit in the TB. One CBG corresponds to a 1-bit ACK or NACK feedback. Since granularity of the retransmission is even smaller, the position of an incorrect transmission may be more precisely reflected, such that the retransmission is more accurate. Further, since the retransmission needs an even smaller data amount, the retransmission efficiency is higher.

However, in case of a service preemption, for example, when the eMBB service is being transmitted or is to be transmitted, and the URLLC service is coming up, the URLLC service may preempt transmission time-frequency resources of the eMBB service. As a result, the original eMBB service may consider by mistake that the eMBB data is incorrectly transmitted in an HARQ feedback process, and consequently the useful URLLC data may be discarded.

SUMMARY

Based on the above, the present disclosure provides a method and apparatus for sending indication information, and user equipment (UE), a base station and a computer-readable storage medium thereof, in order not to discard useful service data.

According to a first aspect of the embodiments of the present disclosure, there is provided a hybrid automatic repeat request (HARQ) feedback method, comprising:

receiving a first-service data transmission from a base station, wherein schedule control data of the first-service data transmission carries indication information, which is configured to explicitly or implicitly indicate that second-service data preempts a transmission resource of first-service data or the second-service data preempts a transmission resource position of the first-service data;

retaining the second-service data preempting the transmission resource in a cache according to the indication information, and generating HARQ feedback information of the first-service data; and sending the HARQ feedback information to the base station.

According to a second aspect of the embodiments of the present disclosure, there is provided a method for sending indication information, comprising:

judging whether second-service data preempts a transmission resource of first-service data;

if the second-service data preempts the transmission resource of the first-service data, sending a first-service data transmission to user equipment (UE), wherein schedule control data of the first-service data transmission carries indication information, which is configured to explicitly or implicitly indicate that the second-service data preempts the transmission resource of the first-service data or the second-service data preempts a transmission resource position of the first-service data, such that the UE retains the second-service data preempting the transmission resource in a cache according to the indication information and sends HARQ feedback information of the first-service data to a base station.

According to a third aspect of the embodiments of the present disclosure, there is provided user equipment, comprising:

a processor; and a memory for storing instructions executable by the processor;

wherein the processor is configured to:

receive a first-service data transmission from a base station, schedule control data of the first-service data transmission carrying indication information, the indication information explicitly or implicitly indicating that second-service data preempts a transmission resource of first-service data or second-service data preempts a transmission resource position of first-service data;

retaining the second-service data preempting the transmission resource in a cache based on the indication information, and generating HARQ feedback information of the first-service data; and send the HARQ feedback information to the base station.

According to a fourth aspect of the embodiments of the present disclosure, there is provided a base station, comprising:

a processor; and a memory for storing instructions executable by the processor;

wherein the processor is configured to:

judge whether second-service data preempts a transmission resource of first-service data;

if the second-service data preempts the transmission resource of the first-service data, send a first-service data transmission to user equipment (UE), the schedule control data of the first-service data transmission carrying indication information, the indication information explicitly or implicitly indicating that the second-service data preempts the transmission resource of the first-service data or the second-service data preempts a transmission resource position of the first-service data, such that the UE retains the second-service data preempting the transmission resource in a cache based on the indication information and sends HARQ feedback information of the first-service data to a base station.

The technical solutions according to the embodiments of the present disclosure may achieve the following beneficial effects:

By receiving the indication information carried in the first-service data transmission, the second-service data preempting the transmission resource in the cache, such that the useful second-service data may not be discarded during the first-service data transmission.

The indication information is acquired from the schedule control data of the later first-service data transmission, and it is acknowledged from the indication information that the second-service data preempts the transmission resource of the first-service data, such that the UE may not discard the useful second-service data during the first-service data transmission, and the transmission success or failure state of the first-service data may be correctly fed back to the base station. In this way, the base station may retransmit the first-service data that fails to be truly transmitted.

The transmission success or failure state of the first-service data may be correctly reflected, such that misoperations of the UE may be prevented.

All the data that fails to be transmitted is retained in the cache, the first-service data that fails to be transmitted is identified from the retained data, and the HARQ feedback information may be generated based on the first-service data that fails to be transmitted, such that the generated HARQ feedback information may correctly reflect the transmission success or failure state of the first-service data.

When the indication information is carried in the schedule control data of the later first-service data transmission, the HARQ feedback information is sent to the base station in the non-adaptive HARQ feedback mode, such that the UE may correctly feed back the transmission success or failure state of the first-service data to the base station.

The indication information is scrambled on the target control information in the schedule control data in a scrambling fashion, such that it is implicitly indicated that the second-service data preempts the transmission resource of the first-service data or the second-service data preempts the transmission resource position of the first-service data. The practice is simple.

When it is determined that the second-service data preempts the transmission resource of the first-service data, the first-service data transmission carrying the indication information is sent to the UE, to notify the UE that the second-service data preempts the transmission resource of the first-service data, such that misoperations of the UE may be prevented.

The indication information is carried from the schedule control data of the later first-service data transmission, such that the UE may acknowledge from the indication information that the second-service data preempts the transmission resource of the first-service data. As such, the UE may not discard the useful second-service data during the first-service data transmission, and may correct feed back the transmission success or failure state of the first-service data to the base station. In this way, the base station may retransmit the first-service data that fails to be truly transmitted.

By retransmitting the first-service data that fails to be transmitted to the UE based on the received HARQ feedback information of the first-service data corresponding to the other transmission resource position, the base station may identify the first-service data that is to be truly retransmitted.

The indication information is scrambled on the target control information in the schedule control data in a scrambling fashion, such that it is implicitly indicated that the second-service data preempts the transmission resource of the first-service data or the second-service data preempts the transmission resource position of the first-service data. The practice is simple.

It is to be understood that both the foregoing general description and the following detailed description are exemplary and explanatory only and are intended to limit the present disclosure.

DETAILED DESCRIPTION

In order to describe the principles, technical solutions and advantages in the embodiments of the present clearly and completely, the present disclosure will be described in detail below in combination with the accompanying drawings.

Apparently, the described embodiments are merely some embodiments, rather than all embodiments, of the present disclosure. Based on the embodiments of the present disclosure, all other embodiments derived by a person of ordinary skill in the art without creative efforts shall fall within the protection scope of the present disclosure.

Figure 1:
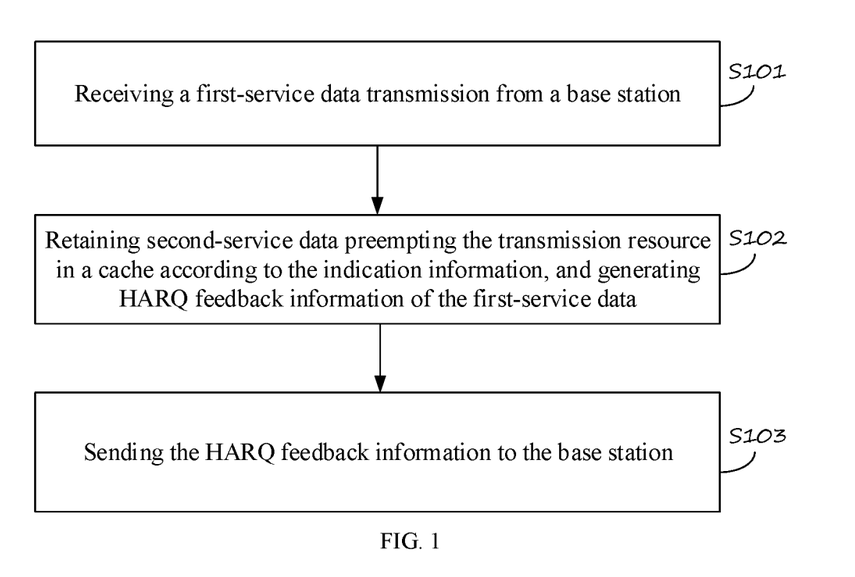
FIG. 1 is a flowchart of an HARQ feedback method according to an exemplary embodiment of the present disclosure.

FIG. 1 is a flowchart of an HARQ feedback method according to an exemplary embodiment of the present disclosure. This embodiment is described from a UE side. As illustrated in FIG. 1, the HARQ feedback method includes the following steps:

In step S101, a first-service data transmission is received from a base station, wherein schedule control data of the first-service data transmission carries indication information, and the indication information explicitly or implicitly indicates that second-service data preempts a transmission resource of first-service data or second-service data preempts a transmission resource position of first-service data.

In this embodiment, a second service imposes a higher requirement on timeliness relative to a first service, and therefore, the second-service data may preempt the first-service data. The first service may include, but not limited to, eMBB, and the second service may include, but not limited to, URLLC.

When a UE receives one first-service data transmission from the base station, the indication information may be carried in the schedule control data of the one first-service data transmission, wherein the indication information explicitly or implicitly indicates that the second-service data preempts the transmission resource of the first-service data or the second-service data preempts the transmission resource position of the first-service data. When the UE receives two first-service data transmissions from the base station, the indication information may be carried in the schedule control data of a later first-service data transmission, wherein the indication information explicitly or implicitly indicates that the second-service data preempts the transmission resource of the first-service data or the second-service data preempts the transmission resource position of the first-service data in an earlier first-service data transmission. The schedule control data may include, but not limited to, a physical downlink control channel (PDCCH). It should be noted that in the later case, a time interval between the two first-service data transmissions is less than a transmission latency in a non-adaptive HARQ feedback mode; and otherwise, before the schedule control data of the later first-service data transmission comes, HARQ feedback information needs to be sent to the base station. That is, the UE needs to send the HARQ feedback information to the base station before receiving the indication information.

In step S102, the second-service data preempting the transmission resource is retained in a cache according to the indication information, and HARQ feedback information of the first-service data is generated.

In this embodiment, the second-service data preempting the transmission resource may be retained in a cache according to the indication information, for transmitting the second-service data.

The HARQ feedback information may be generated in a plurality of ways. For example, the HARQ feedback information may be generated based on a transmission success or failure state of data other than the second-service data preempting the transmission resource. Still for example, a transmission success or failure state of the second-service data preempting the transmission resource may be set as transmission success, and the HARQ feedback information is generated according to transmission success or failure states of all the data in the first-service data transmission.

The generated HARQ feedback information may correctly reflect the transmission success or failure state of the first-service data, such that misoperations.

In step S103, the HARQ feedback information is sent to the base station.

In this embodiment, when the indication information is carried in the schedule control data of the later first-service data transmission, the HARQ feedback information may be sent to the base station in the non-adaptive HARQ feedback mode.

In the above embodiment, by receiving the indication information carried in the first-service data transmission, the second-service data preempting the transmission resource is retained in the cache, such that the useful second-service data may not be discarded during the first-service data transmission.

Figure 2:
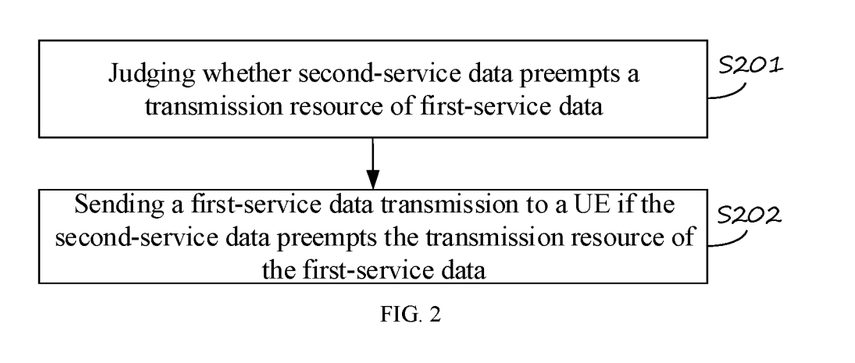
FIG. 2 is a flowchart of a method for sending indication information according to an exemplary embodiment of the present disclosure.

FIG. 2 is a flowchart of a method for sending indication information according to an exemplary embodiment of the present disclosure. This embodiment is described from a base station side. As illustrated in FIG. 2, the method includes the following steps:

In step S201, whether second-service data preempts a transmission resource of first-service data is judged.

The first service may include, but not limited to, eMBB, and the second service may include, but not limited to, URLLC. A second service imposes a higher requirement on timeliness relative to a first service, and therefore, the second-service data may preempt the first-service data. In this embodiment, the base station may judge whether the second-service data preempts the transmission resource of the first-service data.

In step S202, if the second-service data preempts the transmission resource of the first-service data, a first-service data transmission is sent to a UE, wherein the schedule control data of the first-service data transmission carries indication information, and the indication information explicitly or implicitly indicates that the second-service data preempts the transmission resource of the first-service data or the second-service data preempts a transmission resource position of the first-service data, such that the UE sends HARQ feedback information of the first-service data to a base station based on first indication information.

In this embodiment, if the base station determines that the second-service data preempts the transmission resource of the first-service data, the indication information may be carried in the schedule control data of the first-service data transmission sent to the UE. The indication information may give an explicit indication, for example, several bits of indication information may be directly added, or the indication information may give an implicit indication, for example, the indication information is scrambled on target control information in the schedule control data, that is, the corresponding indication information is scrambled on a portion of the original control information. The indication information may indicate that the second-service data preempts the transmission resource of the first-service data or the second-service data preempts the transmission resource position of the first-service data, wherein the transmission resource position may be indicated by a bitmap. Upon receiving the indication information, the UE may retain the second-service data preempting the transmission resource in a cache according to the indication information, and sends the HARQ feedback information of the first-service data to the base station.

The sending the first-service data transmission by the base station to the UE may include: sending one first-service data transmission by the base station to the UE. In this case, the indication information may be carried in the schedule control data of the one first-service data transmission, and the indication information explicitly or implicitly indicates that the second-service data preempts the transmission resource of the first-service data or the second-service data preempts the transmission resource position of the first-service data.

In addition, the sending the first-service data transmission by the base station to the UE may further include: sending two first-service data transmissions by the base station to the UE. In this case, the indication information may be carried in the schedule control data of a later first-service data transmission, and the indication information explicitly or implicitly indicates that the second-service data preempts the transmission resource of the first-service data or the second-service data preempts the transmission resource position of the first-service data in an earlier first-service data transmission.

The schedule control data may include, but not limited to, a physical downlink control channel (PDCCH).

It should be noted that in the later case, a time interval between the two first-service data transmissions is less than a transmission latency in a non-adaptive HARQ feedback mode; and otherwise, before the schedule control data of the later first-service data transmission comes, HARQ feedback information needs to be sent to the base station. That is, the UE needs to send the HARQ feedback information to the base station before receiving the indication information, i.e., the UE fails to prevent misoperations based on the indication information.

In the above embodiment, when it is determined that the second-service data preempts the transmission resource of the first-service data, the first-service data transmission carrying the indication information is sent to the UE, to notify the UE that the second-service data preempts the transmission resource of the first-service data, such that the misoperations of the UE may be prevented.

Figure 3:
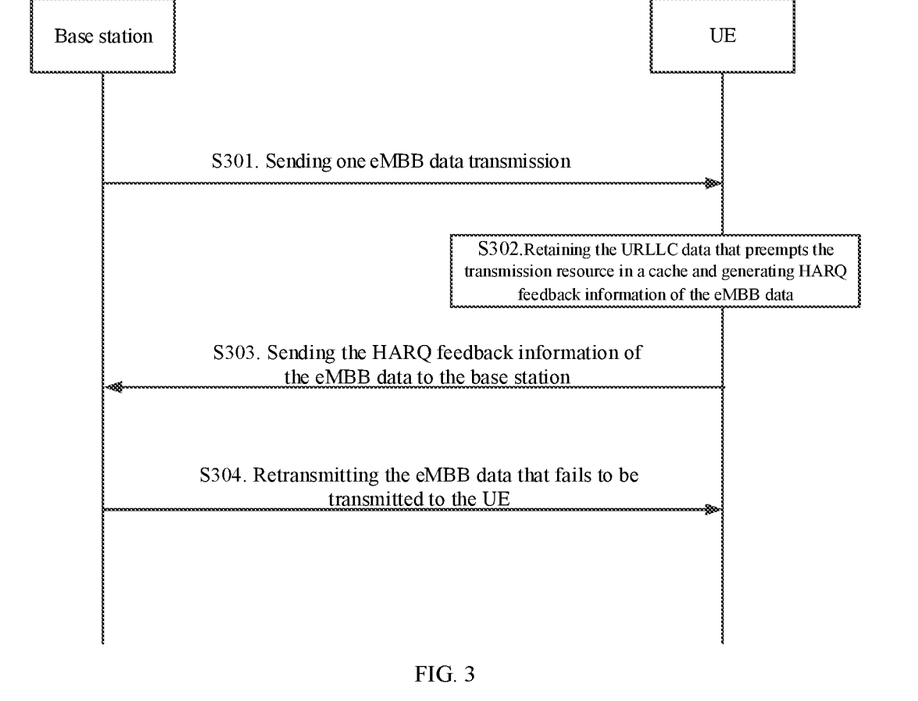
FIG. 3 is a signaling flowchart of an HARQ feedback method according to an exemplary embodiment of the present disclosure.
Figure 4:
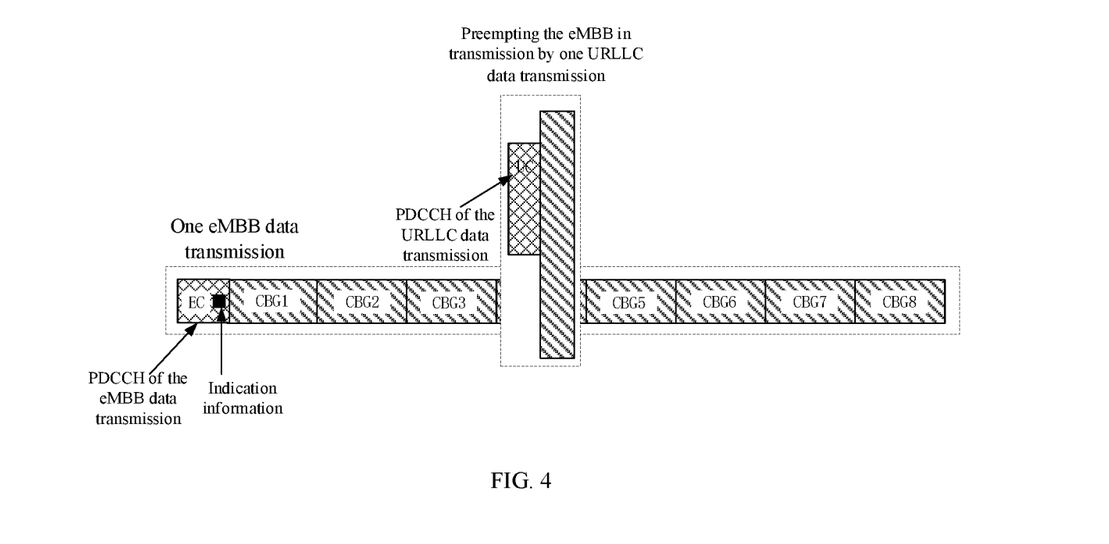
FIG. 4 is a schematic diagram illustrating that indication information is carried in one eMBB transmission process according to an exemplary embodiment of the present disclosure.

FIG. 3 is a signaling flowchart of an HARQ feedback method according to an exemplary embodiment of the present disclosure. This embodiment is described from a perspective of interactions between a UE and a base station. For clearer descriptions of the interactions between the UE and the base station, this embodiment is described with reference to FIG. 4. FIG. 4 is a schematic diagram illustrating that indication information is carried in one eMBB transmission process according to an exemplary embodiment of the present disclosure. As illustrated in FIG. 4, the indication information is carried in a PDCCH of the one eMBB data transmission. As illustrated in FIG. 3, the HARQ feedback method includes the following steps:

In step S301, when the base station determines that URLLC data preempts a transmission resource of eMBB data, the base station sends one eMBB data transmission to the UE, wherein the PDCCH of the eMBB data transmission carries indication information.

The indication information may explicitly indicate that the URLLC data preempts the transmission resource of the eMBB data or the URLLC data preempts a transmission resource position of the eMBB data.

In step S302, the UE receives the eMBB data transmission from the base station, and retains the URLLC data preempting the transmission resource in a cache according to the indication information carried in the PDCCH of the eMBB data transmission, and generates HARQ feedback information of the eMBB data.

When the indication information explicitly indicates that the URLLC data preempts the transmission resource of the eMBB data, the UE may retain all the data that fails to be transmitted in the cache, identify the eMBB data that fails to be transmitted from the retained data, and generate the HARQ feedback information based on the eMBB data that fails to be transmitted.

For example, the UE may retain data corresponding to all the transmission resources with NACK feedback in the cache, and may not flush the data. After all the data of the URLLC is transmitted, useful URLLC data in the retained data is used. If still some data remains except the used data, it indicates that the data is the data that truly fails to be transmitted, and the UE may calculate the HARQ feedback information based on the data.

When the indication information explicitly indicates that the URLLC data preempts the transmission resource position of the eMBB data, the UE may retain the URLLC data preempting the transmission resource in the cache for transmitting the URLLC data, and other data with NACK feedback may all be flushed. In addition, the UE may generate the HARQ feedback information based on a transmission success or failure state of data other than the URLLC data preempting the transmission resource. For example, the UE may generate the HARQ feedback information based on a transmission success or failure state of the eMBB data of a code block group (CBG) other than a CBG 4.

In step S303, the UE sends the HARQ feedback information of the eMBB data to the base station.

In step S304, the base station retransmits the eMBB data that fails to be transmitted to the UE based on the received HARQ feedback information.

Optionally, when the indication information indicates that the second-service data preempts the transmission resource position of the first-service data, the base station may receive the HARQ feedback information of the first-service data from the UE, wherein the HARQ feedback information includes HARQ feedback information of the second-service data corresponding to the transmission resource position, and HARQ feedback information of the first-service data corresponding to another transmission resource position; and retransmit the first-service data that fails to be transmitted to the UE according to the HARQ feedback information of the first-service data corresponding to the other transmission resource position. That is, when determining to retransmit the first-service data, the base station ignores the HARQ feedback information of the second-service data corresponding to the transmission resource position, but only considers the HARQ feedback information of the first-service data corresponding to the other resource positions.

For example, the base station may determine the eMBB data to be retransmitted according to the HARQ feedback information of the eMBB data corresponding to the CBG other than the CBG 4 as illustrated in FIG. 4.

In the above embodiment, based on the interactions between the UE and the base station, the UE may acknowledge that the URLLC data preempts the transmission resource of the eMBB data, such that the UE may not discard the useful URLLC data during the eMBB data transmission, and may correctly feed back the transmission success or failure state of the eMBB data to the base station. In this way, the base station may retransmit the eMBB data that truly fails to be transmitted.

It should be noted that with respect to a base station having the capability of judging that the second-service data preempts the first-service data, the HARQ feedback may be generated based on the process as illustrated in FIG. 3. However, with respect to a base station that does not have such capability, the judgment may be practiced based on the indication information carried in the PDCCH of the later first-service data transmission. The indication information may explicitly or implicitly indicate that the second-service data preempts the transmission resource of the first-service data or the second-service data preempts the transmission resource position of the first-service data in the earlier first-service data transmission. The two first-service data transmissions may be contiguous or non-contiguous.

Figure 5:
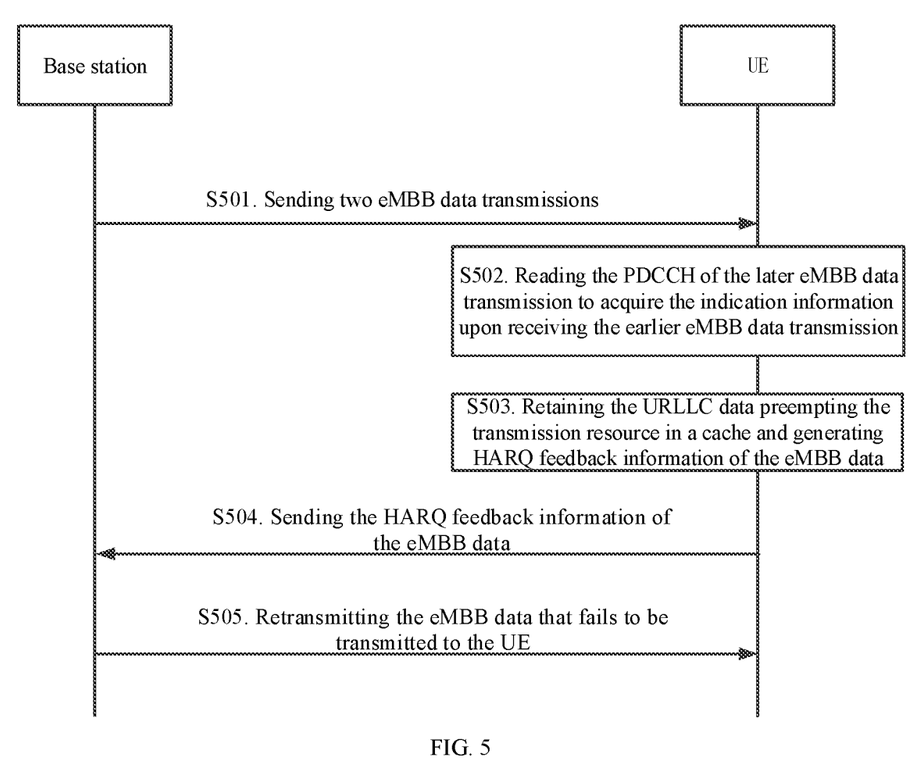
FIG. 5 is a signaling flowchart of another HARQ feedback method according to an exemplary embodiment of the present disclosure.
Figure 6:
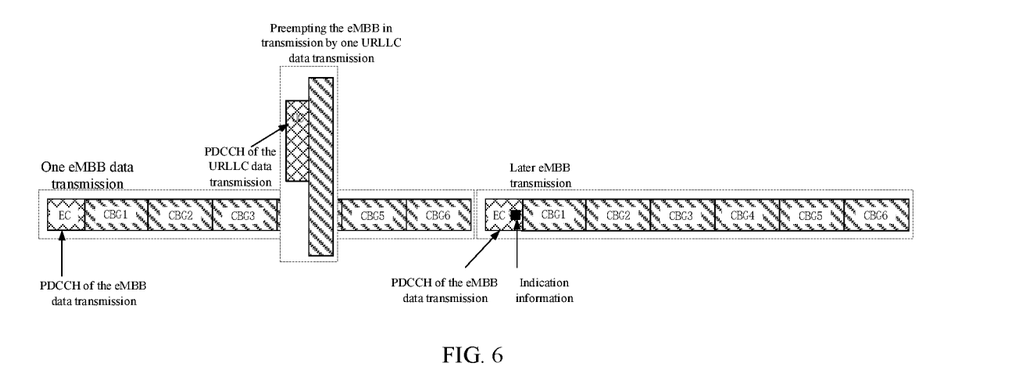
FIG. 6 is a schematic diagram illustrating that indication information is carried in two eMBB transmission processes according to an exemplary embodiment of the present disclosure.

FIG. 5 is a signaling flowchart of another HARQ feedback method according to an exemplary embodiment of the present disclosure. This embodiment is described from the perspective of interactions between a UE and a base station. For clearer descriptions of the interactions between the UE and the base station, this embodiment is described with reference to FIG. 6. As illustrated in FIG. 6, indication information is carried in a PDCCH of a later eMBB data transmission, wherein the indication information may explicitly indicate that URLLC data in an earlier eMBB data transmission preempts a transmission resource of eMBB data or URLLC data preempts a transmission resource position of eMBB data. As illustrated in FIG. 5, the HARQ feedback method includes the following steps:

In step S501, the base station sends two eMBB data transmissions to the UE, wherein a time interval between the two first-service data transmissions is less than a transmission latency in a non-adaptive HARQ feedback mode.

The indication information is carried in schedule control data of a later first-service data transmission.

In step S502, upon receiving the earlier eMBB data transmission, the UE reads the PDCCH of the later eMBB data transmission to acquire the indication information.

In step S503, the URLLC data preempting the transmission resource is retained in a cache according to the acquired indication information, and HARQ feedback information of the eMBB data is generated.

The process of generating the HARQ feedback information in step S503 is the same as the process of generating the HARQ feedback information in step S302, which is not described herein any further.

In step S504, the UE sends the HARQ feedback information of the eMBB data to the base station in a non-adaptive HARQ feedback mode.

In step S505, the base station retransmits the eMBB data that fails to be transmitted to the UE based on the received HARQ feedback information.

In the above embodiment, based on the interactions between the UE and the base station, the UE may acquire the indication information from the schedule control data of the later first-service data transmission, and acknowledge that the URLLC data preempts the transmission resource of the eMBB data, such that the UE may not discard the useful URLLC data during the eMBB data transmission, and may correctly feed back the transmission success or failure state of the eMBB data to the base station. In this way, the base station may retransmit the eMBB data that truly fails to be transmitted.

Figure 7:
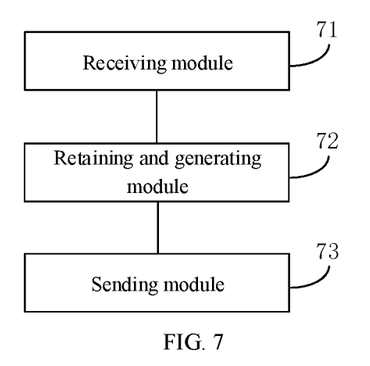
FIG. 7 is a block diagram of an HARQ feedback apparatus according to an exemplary embodiment of the present disclosure.

FIG. 7 is a block diagram of an HARQ feedback apparatus according to an exemplary embodiment of the present disclosure. The HARQ feedback apparatus is arranged in a UE, and includes a receiving module 71, a retaining and generating module 72 and a sending module 73.

The receiving module 71 is configured to receive a first-service data transmission from a base station, schedule control data of the first-service data transmission carrying indication information, wherein the indication information explicitly or implicitly indicates that second-service data preempts a transmission resource of first-service data or second-service data preempts a transmission resource position of first-service data.

In this embodiment, a second service imposes a higher requirement on timeliness relative to a first service, and therefore, the second-service data may preempt the first-service data. The first service may include, but not limited to, eMBB, and the second service may include, but not limited to, URLLC.

When the UE receives one first-service data transmission from the base station, the indication information may be carried in the schedule control data of the one first-service data transmission, wherein the indication information explicitly or implicitly indicates that the second-service data preempts the transmission resource of the first-service data or the second-service data preempts the transmission resource position of the first-service data. When the UE receives two first-service data transmissions from the base station, the indication information may be carried in the schedule control data of a later first-service data transmission, wherein the indication information explicitly or implicitly indicates that the second-service data preempts the transmission resource of the first-service data or the second-service data preempts the transmission resource position of the first-service data. The schedule control data may include, but not limited to, a PDCCH. It should be noted that in the later case, a time interval between the two first-service data transmissions is less than a transmission latency in a non-adaptive HARQ feedback mode; and otherwise, before the schedule control data of the later first-service data transmission comes, HARQ feedback information needs to be sent to the base station. That is, the UE needs to send the HARQ feedback information to the base station before receiving the indication information.

The retaining and generating module 72 is configured to the second-service data preempting the transmission resource in a cache according to the indication information carried in the schedule control data of the first-service data transmission received by the receiving module 71, and generate HARQ feedback information of the first-service data.

In an embodiment, when the indication information explicitly or implicitly indicates that the second-service data preempts the transmission resource of the first-service data, the retaining and generating module 72 may be configured to: retain all the data that fails to be transmitted in the cache, identify the first-service data that fails to be transmitted from the retained data, and generate the HARQ feedback information based on the first-service data that fails to be transmitted.

The sending module 73 is configured to send the HARQ feedback information generated by the retaining and generating module 72 to the base station.

When the indication information is carried in the schedule control data of the later first-service data transmission, the sending module 73 may be configured to send the HARQ feedback information to the base station in the non-adaptive HARQ feedback mode.

In the above embodiment, by receiving the indication information carried in the first-service data transmission, the second-service data preempting the transmission resource in the cache, such that the useful second-service data may not be discarded during the first-service data transmission.

Figure 8:
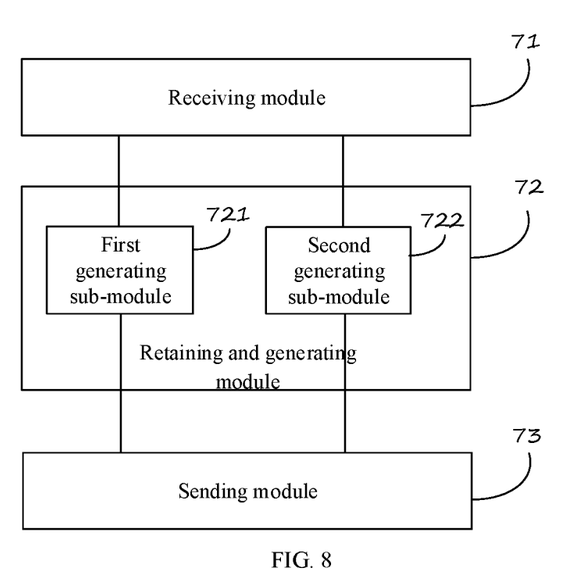
FIG. 8 is a block diagram of another HARQ feedback apparatus according to an exemplary embodiment of the present disclosure.

FIG. 8 is a block diagram of another HARQ feedback apparatus according to an exemplary embodiment of the present disclosure. As illustrated in FIG. 8, based on the embodiment as illustrated in FIG. 7, the retaining and generating module 72 may include a first generating sub-module 721 or a second generating sub-module 722.

The first generating sub-module 721 is configured to generate the HARQ feedback information based on a transmission success or failure state of data other than the second-service data preempting the transmission resource.

The second generating sub-module 722 is configured to set a transmission success or failure state of the second-service data preempting the transmission resource as transmission success, and generate the HARQ feedback information transmission success or failure states of all the data in the first-service data transmission.

The HARQ feedback information may be generated in a plurality of ways. For example, the HARQ feedback information may be generated based on a transmission success or failure state of data other than the second-service data preempting the transmission resource. Still for example, a transmission success or failure state of the second-service data preempting the transmission resource may be set as transmission success, and the HARQ feedback information is generated according to transmission success or failure states of all the data in the first-service data transmission.

In the above embodiment, the HARQ feedback information generated by the first generating sub-module or the second generating sub-module may correctly reflect the transmission success or failure state of the first-service data, such that misoperations of the UE may be prevented.

Figure 9:
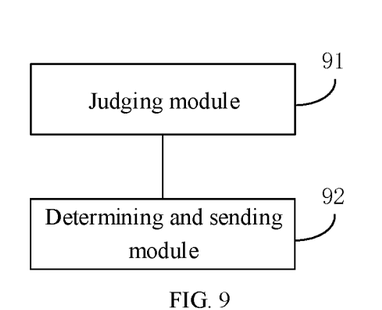
FIG. 9 is a block diagram of an apparatus for sending indication information according to an exemplary embodiment of the present disclosure.

FIG. 9 is a block diagram of an apparatus for sending indication information according to an exemplary embodiment of the present disclosure. The apparatus is arranged in a base station, and includes a judging module 91 and a determining and sending module 92.

The judging module 91 is configured to judge whether second-service data preempts a transmission resource of first-service data.

A first service may include, but not limited to, eMBB, and a second service may include, but not limited to, URLLC. The second service imposes a higher requirement on timeliness relative to the first service, and therefore, the second-service data may preempt the first-service data. In this embodiment, the base station may judge whether the second-service data preempts the transmission resource of the first-service data.

The determining and sending module 92 is configured to: if the judging module 91 judges that the second-service data preempts the transmission resource of the first-service data, send a first-service data transmission to user equipment (UE), wherein the schedule control data of the first-service data transmission carries indication information, and the indication information explicitly or implicitly indicates that second-service data preempts the transmission resource of the first-service data or the second-service data preempts a transmission resource position of the first-service data, such that the UE retains the second-service data preempting the transmission resource in a cache according to the indication information and sends HARQ feedback information of the first-service data to a base station.

In this embodiment, if the base station determines that the second-service data preempts the transmission resource of the first-service data, the indication information may be carried in the schedule control data of the first-service data transmission sent to the UE. The indication information may give an explicit indication, for example, several bits of indication information may be directly added, or the indication information may give an implicit indication, for example, the indication information is scrambled on target control information in the schedule control data, that is, the corresponding indication information is scrambled on a portion of the original control information. The indication information may be used for indicating that the second-service data preempts the transmission resource of the first-service data or the second-service data preempts the transmission resource position of the first-service data, wherein the transmission resource position may be indicated by a bitmap. Upon receiving the indication information, the UE may retain the second-service data preempting the transmission resource in a cache according to the indication information, and sends the HARQ feedback information of the first-service data to the base station.

The sending the first-service data transmission by the base station to the UE may include: sending one first-service data transmission by the base station to the UE. In this case, the indication information may be carried in the schedule control data of the one first-service data transmission, and the indication information explicitly or implicitly indicates that the second-service data preempts the transmission resource of the first-service data or the second-service data preempts the transmission resource position of the first-service data.

In an embodiment, the determining and sending module 92 is configured to send two first-service data transmissions to the UE, wherein a time interval between the two first-service data transmissions is less than a transmission latency in a non-adaptive HARQ feedback mode. The indication information is carried in the schedule control data of a later first-service data transmission, and the indication information explicitly or implicitly indicates that the second-service data preempts the transmission resource of the first-service data or the second-service data preempts the transmission resource position of the first-service data in an earlier first-service data transmission.

In the above embodiment, when it is determined that the second-service data preempts the transmission resource of the first-service data, the first-service data transmission carrying the indication information is sent to the UE, to notify the UE that the second-service data preempts the transmission resource of the first-service data, such that misoperations of the UE may be prevented.

Figure 10:
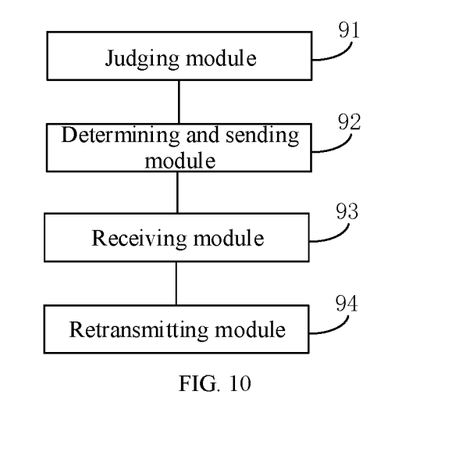
FIG. 10 is a block diagram of another apparatus for sending indication information according to an exemplary embodiment of the present disclosure.

FIG. 10 is a block diagram of another apparatus for sending indication information according to an exemplary embodiment of the present disclosure. As illustrated in FIG. 10, based on the embodiment as illustrated in FIG. 9, when the indication information explicitly or implicitly indicates that the second-service data preempts the transmission resource position of the first-service data, the apparatus may further include a receiving module 93 and a retransmitting module 94.

The receiving module 93 is configured to receive HARQ feedback information of the first-service data from the UE, wherein the HARQ feedback information includes HARQ feedback information of the second-service data corresponding to the transmission resource position of the second-service data and HARQ feedback information of the first-service data corresponding to another transmission resource position.

The retransmitting module 94 is configured to retransmit, according to the HARQ feedback information of the first-service data corresponding to the another transmission resource position, the first-service data that fails to be transmitted to the UE.

When the indication information indicates that the second-service data preempts the transmission resource position of the first-service data, the base station may receive the HARQ feedback information of the first-service data from the UE, wherein the HARQ feedback information includes HARQ feedback information of the second-service data corresponding to the transmission resource position, and HARQ feedback information of the first-service data corresponding to another transmission resource position; and retransmit the first-service data that fails to be transmitted to the UE according to the HARQ feedback information of the first-service data corresponding to the other transmission resource position. That is, when determining to retransmit the first-service data, the base station ignores the HARQ feedback information of the second-service data corresponding to the transmission resource position, but only considers the HARQ feedback information of the first-service data corresponding to the other resource positions.

In the above embodiment, by retransmitting the first-service data that fails to be transmitted to the UE based on the received HARQ feedback information of the first-service data corresponding to the other transmission resource position, the base station may identify the first-service data that is to be truly retransmitted.

Figure 11:
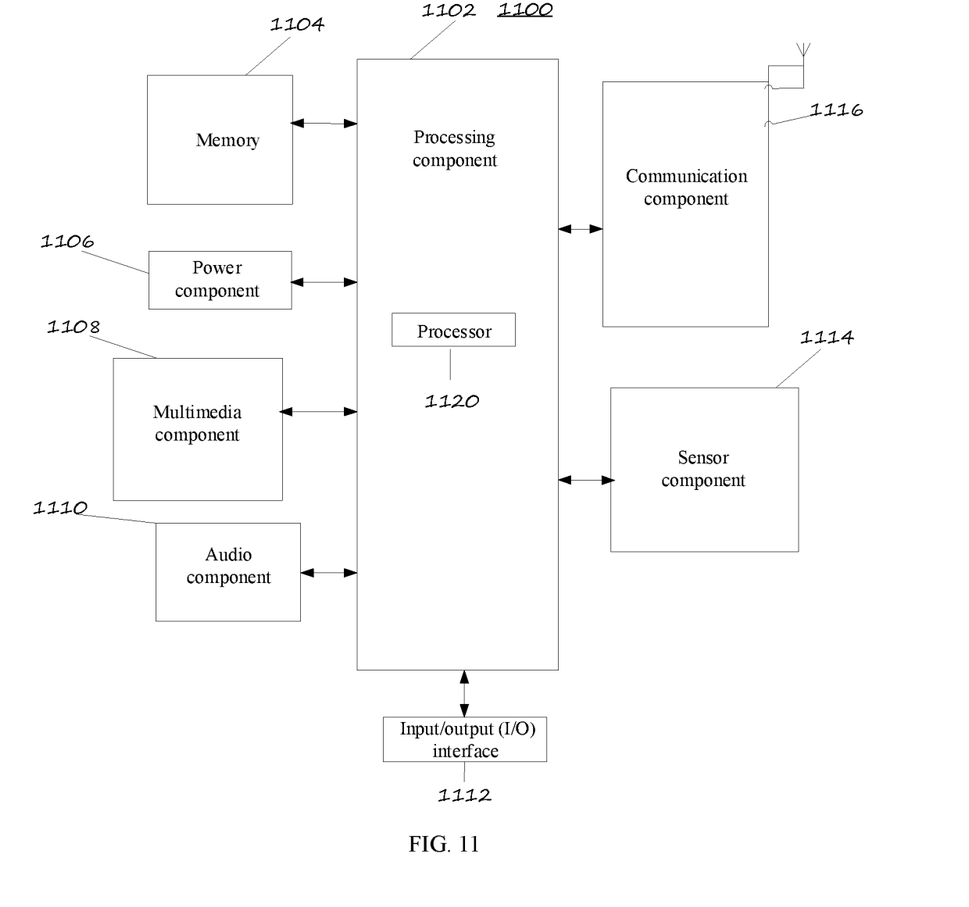
FIG. 11 is a block diagram of an apparatus for use in HARQ feedback according to an exemplary embodiment of the present disclosure.

FIG. 11 is a block diagram of block diagram of an apparatus for use in HARQ feedback in accordance with an exemplary embodiment. For example, the apparatus 1100 may be a mobile phone, a computer, a digital broadcast terminal, a messaging device, a gaming console, a tablet device, a medical device, a fitness equipment, a personal digital assistant, and the like.

Referring to FIG. 11, the apparatus 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls the overall operations of the apparatus 1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the apparatus 1100. Examples of such data include instructions for any applications or methods operated on the apparatus 1100, contact data, phonebook data, messages, pictures, videos, etc. The memory 1104 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the apparatus 1100. The power component 1106 may include a power management system, one or more power sources, and any other components associated with the generation, management, and distribution of power in the apparatus 1100.

The multimedia component 1108 includes a screen providing an output interface between the apparatus 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 1108 includes a front camera and/or a rear camera. The front camera and the rear camera may receive external multimedia data while the apparatus 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone (MIC) configured to receive external audio signals when the apparatus 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker for outputting audio signals.

The I/O interface 1112 provides an interface between the processing component 1102 and peripheral interface modules, such as a keyboard, a click wheel, buttons, and the like. The buttons may include, but are not limited to, a home button, a volume button, a start button, and a lock button.

The sensor component 1114 includes one or more sensors to provide status assessments of various aspects of the apparatus 1100. For instance, the sensor component 1114 may detect an on/off status of the apparatus 1100, relative positioning of components, e.g., the display device and the mini keyboard of the apparatus 1100, and the sensor component 1114 may also detect a position change of the apparatus 1100 or a component of the apparatus 1100, presence or absence of user contact with the apparatus 1100, orientation or acceleration/deceleration of the apparatus 1100, and temperature change of the apparatus 1100. The sensor component 1114 may include a proximity sensor configured to detect the presence of nearby objects without any physical contact. The sensor component 1114 may also include a light sensor, such as a CMOS or CCD image sensor, used for imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the apparatus 1100 and other devices. The apparatus 1100 can access a wireless network based on a communication standard, such as WiFi, 2G, or 3G, or a combination thereof. In an exemplary embodiment, the communication component 616 receives broadcast signals or broadcast associated information from an external broadcast management system via a broadcast channel. In an exemplary embodiment, the communication component 1116 further includes a near field communication (NFC) module to facilitate short-range communications.

In exemplary embodiments, the apparatus 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, a non-transitory computer-readable storage medium including instructions is also provided, such as-the memory 1104 including instructions, executable by the processor 1120 in the apparatus 1100, for performing the above-described methods. For example, the non-transitory computer-readable storage medium may be a ROM, a RAM, a CD-ROM, a magnetic tape, a floppy disc, an optical data storage device, and the like.

Figure 12:
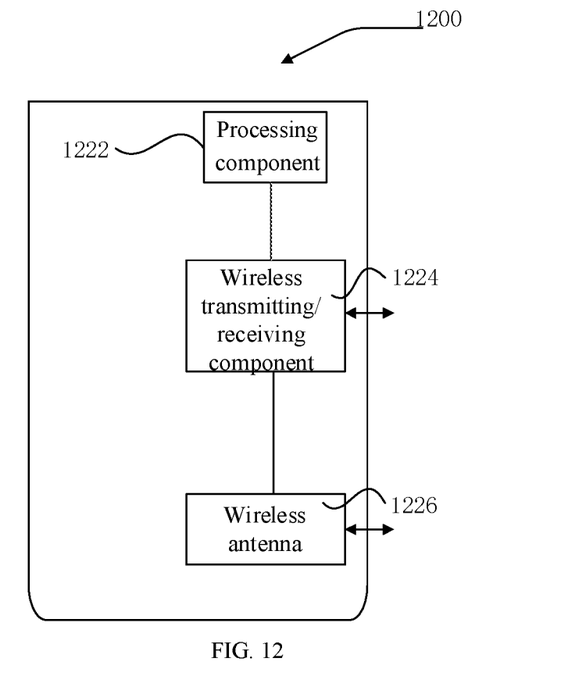
FIG. 12 is a block diagram of an apparatus for use in sending indication information according to an exemplary embodiment of the present disclosure.

FIG. 12 is a block diagram of an apparatus 1200 for use in sending indication information according to an exemplary embodiment of the present disclosure. The apparatus 1200 may be provided as a base station. Referring to FIG. 12, the apparatus 1200 includes a processing component 1222, a wireless transmitting/receiving component 1224, a wireless antenna 1226 and a signal processing part dedicated for a wireless interface. The processing component 1222 may further include one or more processors.

One processor in the processing component 1222 may be configured to: judge whether second-service data preempts a transmission resource of first-service data;

if the second-service data preempts the transmission resource of the first-service data, send a first-service data transmission to a UE, the schedule control data of the first-service data transmission carrying indication information, the indication information explicitly or implicitly indicating that the second-service data preempts the transmission resource of the first-service data or the second-service data preempts a transmission resource position of the first-service data, such that the UE retains the second-service data preempting the transmission resource in a cache according to the indication information and sends HARQ feedback information of the first-service data to a base station.

Since the apparatus embodiments substantially correspond to the method embodiments, the apparatus embodiments are described simply, and the relevant part may be obtained with reference to the part of the description in the method embodiments. The above described apparatus embodiments are merely for illustration purpose only. The units which are described as separate components may be physically separated or may be not physically separated, and the components which are illustrated as units may be or may not be physical units, that is, the components may be located in the same position or may be distributed into a plurality of network units. A part or all of the modules may be selected according to the actual needs to achieve the objectives of the technical solutions of the embodiments. Persons of ordinary skill in the art may understand and implement the present disclosure without paying any creative effort.

It should be noted that, in this specification, such relationship-related terms as "first" and "second" are only used to differentiate one entity or operation from another entity or operation, but are not intended to require or imply that there is a practical relationship or sequence between these entities or operations. It should be noted that, in this specification, terms "comprises", "comprising", "has", "having", "includes", "including", "contains", "containing" or any other variation thereof, are intended to cover a non-exclusive inclusion, such that a process, method, article, or device, that comprises, has, includes, contains a list of elements does not include only those elements but may include other elements not expressly listed or inherent to such process, method, article, or device. An element proceeded by "comprises . . . a", "has . . . a", "includes . . . a", "contains . . . a" does not, without more constraints, preclude the existence of additional identical elements in the process, method, article, or apparatus.

Although the method and apparatus according to the present disclosure have been described in detail above, and the principles and embodiments of the present disclosure have been described with reference to specific embodiments and examples, the above embodiments are described only to help understanding of the method and core idea of the present disclosure. Persons of ordinary skill in the art may make modification or variations to the specific embodiments or application scopes according to the concepts of the present disclosure. In conclusion, this specification shall not be understood as limiting the present disclosure.

What is claimed is:

1. A hybrid automatic repeat request (HARQ) feedback method, comprising:
   receiving a first-service data transmission from a base station, wherein schedule control data of the first-service data transmission carries indication information, and the indication information is configured to explicitly or implicitly indicate one of second-service data preempting a transmission resource of first-service data and the second-service data preempting a transmission resource position of the first-service data;
   retaining the second-service data preempting the transmission resource in a cache according to the indication information, and generating HARQ feedback information of the first-service data; and
   sending the HARQ feedback information to the base station,
   wherein when the indication information is configured to indicate the second-service data preempting the transmission resource of the first-service data, the retaining the second-service data and the generating the HARQ feedback information comprise: retaining all the data that fails to be transmitted in the cache, identifying the first-service data that fails to be transmitted from the retained data, and generating the HARQ feedback information based on the first-service data that fails to be transmitted; and
   when the indication information is configured to indicate the second-service data preempting the transmission resource position of the first-service data, the generating the HARQ feedback information comprises: generating the HARQ feedback information based on a transmission success or failure state of data in the first-service data transmission other than the second-service data preempting the transmission resource.

2. The method according to claim 1, wherein the receiving a first-service data transmission from a base station comprises:
   receiving two first-service data transmissions from the base station, a time interval between the two first-service data transmissions being less than a transmission latency in a non-adaptive HARQ feedback mode;
   wherein the indication information is carried in the schedule control data of a later first-service data transmission, and the indication information is configured to explicitly or implicitly indicate one of the second-service data preempting the transmission resource of the first-service data and the second-service data preempting the transmission resource position of the first-service data in an earlier first-service data transmission.

3. The method according to claim 2, wherein when the indication information is carried in the schedule control data of the later first-service data transmission, the sending the HARQ feedback information to the base station comprises:
sending the HARQ feedback information to the base station in a non-adaptive HARQ feedback mode.

4. The method according to claim 1, wherein the schedule control data of the first-service data transmission carrying the indication information comprises:
scrambling the indication information to target control information in the schedule control data in a form of a scrambling code.

5. A method for sending indication information, comprising:
judging whether second-service data preempts a transmission resource of first-service data;
if the second-service data preempts the transmission resource of the first-service data, sending a first-service data transmission to user equipment (UE), wherein schedule control data of the first-service data transmission carries indication information, and the indication information is configured to explicitly or implicitly indicate one of the second-service data preempting the transmission resource of the first-service data and the second-service data preempting a transmission resource position of the first-service data, such that the UE retains the second-service data preempting the transmission resource in a cache according to the indication information and sends HARQ feedback information of the first-service data to a base station,
wherein when the indication information is configured to indicate that the second-service data preempting the transmission resource of the first-service data, the HARQ feedback information is generated by: retaining all the data that fails to be transmitted in the cache, identifying the first-service data that fails to be transmitted from the retained data, and generating the HARQ feedback information based on the first-service data that fails to be transmitted; and
when the indication information is configured to indicate the second-service data preempting the transmission resource position of the first-service data, the HARQ feedback information is generated based on a transmission success or failure state of data in the first-service data transmission other than the second-service data preempting the transmission resource.

6. The method according to claim 5, wherein the sending a first-service data transmission to the UE comprises:
sending two first-service data transmissions to the UE, a time interval between the two first-service data transmissions being less than a transmission latency in a non-adaptive HARQ feedback mode;
wherein the indication information is carried in the schedule control data of a later first-service data transmission, and the indication information is configured to explicitly or implicitly indicate one of the second-service data preempting the transmission resource of the first-service data and the second-service data preempting the transmission resource position of the first-service data in an earlier first-service data transmission.

7. The method according to claim 5, wherein when the indication information is configured to explicitly or implicitly indicate that the second-service data preempts the transmission resource position of the first-service data, the method further comprises:
receiving HARQ feedback information of the first-service data from the UE, wherein the HARQ feedback information comprises HARQ feedback information of the second-service data corresponding to the transmission resource position and HARQ feedback information of the first-service data corresponding to another transmission resource position; and
retransmitting, according to the HARQ feedback information of the first-service data corresponding to the other transmission resource position, the first-service data that fails to be transmitted to the UE.

8. The method according to claim 5, wherein the schedule control data of the first-service data transmission carrying the indication information comprises:
scrambling the indication information to target control information in the schedule control data in a form of a scrambling code.

9. User equipment, comprising:
a processor; and
a memory for storing instructions executable by the processor;
wherein the processor is configured to:
receive a first-service data transmission from a base station, wherein schedule control data of the first-service data transmission carries indication information, and the indication information is configured to explicitly or implicitly indicate one of second-service data preempting a transmission resource of first-service data and the second-service data preempting a transmission resource position of the first-service data;
retain the second-service data preempting the transmission resource in a cache according to the indication information carried in the schedule control data of the first-service data transmission and generate hybrid automatic repeat request (HARQ) feedback information of the first-service data;
send the HARQ feedback information to the base station,
wherein when the indication information is configured to indicate the second-service data preempting the transmission resource of the first-service data, retaining the second-service data and generating the HARQ feedback information of the first-service data comprise: retaining all the data that fails to be transmitted in the cache, identifying the first-service data that fails to be transmitted from the retained data, and generating the HARQ feedback information based on the first-service data that fails to be transmitted; and
when the indication information is configured to indicate the second-service data preempting the transmission resource position of the first-service data, generating the HARQ feedback information of the first-service data comprises: generating the HARQ feedback information based on a transmission success or failure state of data in the first-service data transmission other than the second-service data preempting the transmission resource.

10. The user equipment according to claim 9, wherein the processor is further configured to receive two first-service data transmissions from the base station, a time interval between the two first-service data transmissions being less than a transmission latency in a non-adaptive HARQ feedback mode;
wherein the indication information is carried in the schedule control data of a later first-service data transmission, and the indication information is configured to explicitly or implicitly indicate one of the second-service data preempting the transmission resource of the first-service data and the second-service data preempting the transmission resource position of the first-service data in an earlier first-service data transmission.

11. The user equipment according to claim 10, wherein when the indication information is carried in the schedule control data of the later first-service data transmission, the processor is further configured to send the HARQ feedback information to the base station in a non-adaptive HARQ feedback mode.

12. The user equipment according to claim 9, wherein the indication information is scrambled on target control information in the schedule control data in a form of a scrambling code.

13. A base station, comprising:
a processor; and
a memory for storing instructions executable by the processor;
wherein the processor is configured to:
judge whether second-service data preempts a transmission resource of first-service data;
if the second-service data preempts the transmission resource of the first-service data, send a first-service data transmission to user equipment (UE), wherein schedule control data of the first-service data transmission carries indication information, and the indication information is configured to explicitly or implicitly indicating one of the second-service data preempting the transmission resource of the first-service data and the second-service data preempting a transmission resource position of the first-service data, such that the UE retains the second-service data preempting the transmission resource in a cache according to the indication information and sends HARQ feedback information of the first-service data to the base station,
wherein when the indication information is configured to indicate the second-service data preempting the transmission resource of the first-service data, the HARQ feedback information is generated by: retaining all the data that fails to be transmitted in the cache, identifying the first-service data that fails to be transmitted from the retained data, and generating the HARQ feedback information based on the first-service data that fails to be transmitted; and when the indication information is configured to indicate the second-service data preempting the transmission resource position of the first-service data, the HARQ feedback information is generated based on a transmission success or failure state of data in the first-service data transmission other than the second-service data preempting the transmission resource.

14. The base station according to claim 13, wherein the processor is further configured to:
send two first-service data transmissions to the UE, a time interval between the two first-service data transmissions being less than a transmission latency in a non-adaptive HARQ feedback mode;
wherein the indication information is carried in the schedule control data of a later first-service data transmission, and the indication information is configured to explicitly or implicitly indicate one of the second-service data preempting the transmission resource of the first-service data and the second-service data preempting the transmission resource position of the first-service data in an earlier first-service data transmission.

15. The base station according to claim 13, wherein when the indication information is configured to explicitly or implicitly indicate that the second-service data preempts the transmission resource position of the first-service data, the processor is further configured to:
receive HARQ feedback information of the first-service data from the UE, wherein the HARQ feedback information comprises HARQ feedback information of the second-service data corresponding to the transmission resource position and HARQ feedback information of the first-service data corresponding to another transmission resource position; and
retransmit, according to the HARQ feedback information of the first-service data corresponding to the other transmission resource position, the first-service data that fails to be transmitted to the UE.

16. The base station according to claim 13, wherein the indication information is scrambled on target control information in the schedule control data in a form of a scrambling code.

* * * * *